United States Patent
Kim et al.

(10) Patent No.: US 9,614,262 B2
(45) Date of Patent: Apr. 4, 2017

(54) BATTERY TEMPERATURE RAISING SYSTEM AND CONTROL METHOD THEREOF

(71) Applicant: Hyundai Motor Company, Seoul (KR)

(72) Inventors: Dal Kim, Gyeonggi-do (KR); Shin Hyuk Yoon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 92 days.

(21) Appl. No.: 14/279,802

(22) Filed: May 16, 2014

(65) Prior Publication Data
US 2015/0144614 A1 May 28, 2015

(30) Foreign Application Priority Data
Nov. 22, 2013 (KR) .......... 10-2013-0142590

(51) Int. Cl.
| | |
|---|---|
| H05B 1/02 | (2006.01) |
| H01M 10/615 | (2014.01) |
| H01M 10/63 | (2014.01) |
| H01M 10/667 | (2014.01) |
| H01M 10/04 | (2006.01) |

(52) U.S. Cl.
CPC ......... *H01M 10/615* (2015.04); *H01M 10/63* (2015.04); *H01M 10/667* (2015.04); *H01M 10/0486* (2013.01); *H01M 2200/106* (2013.01)

(58) Field of Classification Search
CPC ....... H01M 109/615; H01M 2200/106; H01M 10/0486; H01M 10/63; H01M 10/667; H05B 1/0236; H05B 1/0277; H05B 3/0042

USPC .................. 219/494, 203, 505, 517.519, 492
See application file for complete search history.

(56) References Cited

U.S. PATENT DOCUMENTS

| | | | | | |
|---|---|---|---|---|---|
| 2,851,790 | A | * | 9/1958 | Worst ...................... | D06F 58/28 219/400 |
| 2,882,212 | A | * | 4/1959 | Beard ...................... | G01N 7/10 204/408 |
| 4,459,469 | A | * | 7/1984 | Ishima ..................... | B41J 2/195 219/483 |

(Continued)

FOREIGN PATENT DOCUMENTS

| | | |
|---|---|---|
| JP | 2004-088985 A | 3/2004 |
| JP | 3846724 B2 | 11/2006 |

(Continued)

*Primary Examiner* — Mark Paschall
(74) *Attorney, Agent, or Firm* — Mintz Levin Cohn Ferris Glovsky and Popeo, P.C.; Peter F. Corless

(57) ABSTRACT

A battery temperature raising system and a control method thereof are provided. The battery temperature raising system includes a power supply that operates a heater attached to a battery module. The heater is configured to increase a battery temperature and a variable resistor mounted on a circuit between the heater and the power supply adjusts a heating value of the heater based on an adjustment state of a resistance value. A heater relay is mounted on the circuit between the heater and the power supply and opens and closes the circuit to selectively turn on/off the heater. A first sensor senses the battery temperature and a second sensor senses a heater temperature. A controller outputs a control signal to operate the heater relay to selectively turn on/off the heater based on temperature information sensed by the sensors and a control signal to adjust the resistance value of the variable resistor.

8 Claims, 4 Drawing Sheets

(56) References Cited

U.S. PATENT DOCUMENTS

| | | | | |
|---|---|---|---|---|
| 4,990,749 A * | 2/1991 | Devine | ............... | A47J 27/62 |
| | | | | 219/214 |
| 5,632,917 A * | 5/1997 | Cummins | ............. | H05B 3/84 |
| | | | | 219/202 |
| 6,114,668 A * | 9/2000 | Ogata | .................. | B62J 33/00 |
| | | | | 219/202 |
| 6,642,487 B2 * | 11/2003 | Stanzel | ............. | E01C 11/265 |
| | | | | 219/213 |
| 6,955,859 B2 | 10/2005 | Kimura et al. | | |
| 7,027,724 B2 * | 4/2006 | Baxter | ............... | F24H 9/2021 |
| | | | | 392/441 |
| 2007/0210067 A1 * | 9/2007 | Patterson | ........... | F24H 9/2014 |
| | | | | 219/481 |

FOREIGN PATENT DOCUMENTS

| | | |
|---|---|---|
| JP | 2007-026678 A | 2/2007 |
| JP | 2007157665 A | 6/2007 |
| JP | 2008-041614 A | 2/2008 |
| JP | 2009-118729 A | 5/2009 |
| JP | 2011040330 A | 2/2011 |
| KR | 10-125360 | 5/1998 |
| KR | 10-2005-0095954 | 10/2005 |
| KR | 10-2005-0095954 A | 10/2005 |
| KR | 10-0536204 B1 | 12/2005 |
| KR | 10-2008-0006817 | 1/2008 |
| KR | 10-0802802 B1 | 2/2008 |

\* cited by examiner

BATTERY TEMPERATURE RAISING SYSTEM AND CONTROL METHOD THEREOF

CROSS-REFERENCE TO RELATED APPLICATIONS

This application claims priority to and the benefit of Korean Patent Application No. 10-2013-0142590 filed in the Korean Intellectual Property Office on Nov. 22, 2013, the entire contents of which are incorporated herein by reference.

TECHNICAL FIELD

The present invention relates to a battery temperature raising system and a control method thereof, and more particularly, to a battery temperature raising system and a control method thereof that perform a heating control more efficiently to shorten a battery temperature rising time while shortening the battery temperature rising time in a cryogenic condition.

BACKGROUND

Lithium polymer batteries (LiPBs), as a next-generation secondary battery, have been used as a battery in an eco-friendly vehicle such as an electric vehicle or a hybrid vehicle. The lithium polymer battery (LiPB) is a secondary battery that uses a solid electrolyte having excellent ion conductivity. In a liquid electrolyte cell, an electrolytic solution may likely leak and an organic solvent used in the electrolytic solution is a flammable material, whereas a solid electrolyte cell such as the lithium polymer battery has an advantage in that the cell has no possibility (e.g., minimal) of leakage of an electrolytic solution and risk of explosion, has a low internal resistance and a high energy density, and does not cause a reduction in lifespan of the battery without full charging and full discharging since the cell does not have a memory effect.

However, in a substantially low temperature region, as a state of charge (SOC) decreases, the internal resistance of the battery rapidly increases, causing a discharge output to decrease. Since a driving condition of a vehicle is determined by an output based on the battery temperature and the SOC rather than limiting an output based on the SOC of the battery in the driving state of the vehicle, there is a need to increase the battery in a substantially low temperature state to a proper temperature (e.g., a predetermined temperature for the driving state) to secure power performance of the vehicle at the substantially low temperature.

When the battery is charged in the substantially low temperature state, overvoltage rising of an anode and a cathode is asymmetrically increased, such that compared with the charging at room temperature, charging capacity may be decreased and a cathode voltage may be decreased to a substantially low voltage. In particular, metal-like lithium is educed in the battery, and when this condition is repeated for a substantial period of time, the performance of the battery may deteriorate and an internal short-circuit may occur.

To efficiently use the lithium polymer battery (LiPB), and secure safety and durability life of the LiPB, there is a need to properly manage a use temperature of the battery. However, when a heater rapidly applies heat to increase the battery temperature, there may be a risk of fire, explosion, and the like, and therefore, a need exists for a system to efficiently control heat of the heater based on the temperature and peripheral condition of the battery.

As the current battery temperature raising system, a method for increasing the battery temperature by heating a fluid circulating a battery pack with a positive temperature coefficient (PTC) heater, a method for heating air around the battery by using a blanket type heater that surrounds a battery module, and the like have been previously developed.

The main performance of the battery temperature raising system depends on the short temperature rising time to rapidly improve the output of the battery at the lower temperature and the safety assurance to prevent a risk such as a fire from occurring in any situation. To shorten the battery temperature rising time, there is a need to decrease resistance of power supply to increase a heating value from the heater, and to secure the safety of the battery, there is a need to increase resistance of power supply to decrease the heating value from the heater.

However, according to the related art, when the heating value from the heater is increased unconditionally, the fire in the battery may occur in an abnormal situation, and particularly, a spark may occur due to a thermal deformation of the heater and the fire of the battery may occur due to the leakage of the flammable gas, and the like which are caused by an excessive battery temperature rising, which may lead to a risk of the overall vehicle. When the heating value from the heater is increased in consideration of only the shortening of the temperature rising time, it may be difficult to secure the safety of the battery due to the continuous heating during the failure of the temperature raising system.

SUMMARY

The present invention provides a battery temperature raising system and a control method thereof that may perform a heating control more efficiently to shorten a battery temperature rising time while shortening the battery temperature rising time in a cryogenic condition In addition, the present invention provides a battery temperature raising system and a control method thereof that secure durability of the battery and prevent thermal deformation of a heater by preventing a battery temperature from excessively rising and a heater from overheating.

Further, the present invention provides a battery temperature raising system and a control method thereof that shorten a battery temperature rising time and secure safety of the battery while resolving problems which occurs when considering only the shortening of the battery temperature rising time. The present invention also provides a battery temperature raising system and a control method thereof that prevent unnecessary energy waste during a battery temperature rising process and save charging costs by shortening a charging time to enable more rapid charging.

An exemplary embodiment of the present invention provides a battery temperature raising system that may include: a power supply configured to operate a heater; a heater attached to a battery module and configured to increase a battery temperature by a heating operation; a variable resistor mounted on a circuit between the heater and the power supply and configured to adjust a heating value of the heater based on an adjustment state of a resistance value; a heater relay mounted on the circuit between the heater and the power supply and configured to open and close the circuit to selectively turn the heater on and off; a first sensor configured to sense the battery temperature; a second sensor configured to sense a heater temperature; and a controller configured to output a control signal to operate the heater relay to selectively turn the heater on and off based on temperature information sensed by the first and second sensors and a control signal to adjust the resistance value of the variable resistor.

The controller may be configured to turn on the heater relay when the battery temperature is lower than a predetermined first reference temperature T1 and decrease the resistance value of the variable resistor when the battery temperature is in a cryogenic state lower than a second reference temperature T2 (T2<T1) to perform a resistance value adjusting process to increase a heat value of the heater. In response to determining that deviation between the heater temperature and the battery temperature is equal to or less than a predetermined temperature deviation by comparing the deviation between the heater temperature and the battery temperature with the predetermined temperature deviation during the resistance value adjusting process, the controller may be set to decrease the resistance value of the variable resistor.

The controller may be set to decrease the heating value of the heater by increasing the resistance value of the variable resistor when the deviation between the heater temperature and the battery temperature is greater than the predetermined temperature deviation during the resistance value adjusting process. In response to determining that the battery temperature rises to a temperature greater than a third reference temperature by comparing the battery temperature with the predetermined third reference temperature T3 (T1>T3>T2) after the resistance value adjusting process, the controller may be configured to increase the resistance value of the variable resistor to perform an additional resistance value adjusting process of decreasing the heating value of the heater.

Further, in response to determining that the deviation between the heater temperature and the battery temperature is equal to or less than the predetermined temperature deviation by comparing the deviation between the heater temperature and the battery temperature with the predetermined temperature deviation during the additional resistance value adjusting process, the controller may be set to increase the resistance value of the variable resistor. When the deviation between the heater temperature and the battery temperature is greater than the predetermined temperature deviation during the additional resistance value adjusting process, the controller may be configured to increase the resistance value of the variable resistor to decrease the heating value of the heater, and then when the deviation between the heater temperature and the battery temperature is less than the predetermined temperature deviation, additionally increase the resistance value of the variable resistor.

Another exemplary embodiment of the present invention provides a control method of a battery temperature raising system that may include: sensing, by a sensor, a battery temperature and a heater temperature; operating, by a controller, a heater to increase the battery temperature by turning on a heater relay when the battery temperature is less than a predetermined first reference temperature T1; adjusting, by the controller, a resistance value to increase a heating value of the heater by reducing a resistance value of a variable resistor when the battery temperature is in a cryogenic state less than a second reference temperature T2 (T2<T1); and additionally adjusting, by the controller, a resistance value to decrease the heating value of the heater by increasing the resistance value of the variable resistor when the battery temperature rises to a temperature greater than a predetermined third reference temperature by comparing the battery temperature with the third reference temperature T3 (T1>T3>T2) after the adjusting of the resistance value.

According to the battery temperature raising system and the control method thereof according to the exemplary embodiments of the present invention, it may be possible to perform the heating control more efficiently to shorten the temperature rising time while shortening the battery temperature rising time in the cryogenic condition. Further, it may be possible to secure the durability of the battery and prevent the thermal deformation of the heater and reduce and secure safety of the battery temperature rising time, by preventing the battery temperature from excessively rising and the heater from overheating. Additionally, it may be possible to prevent the unnecessary energy waste during the battery temperature rising process and save the charging costs by shortening the charging time to enable the quick charging.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited/control unit to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings so that the exemplary embodiment may be easily carried out by those skilled in the art to which the present invention pertains.

Figure 1:
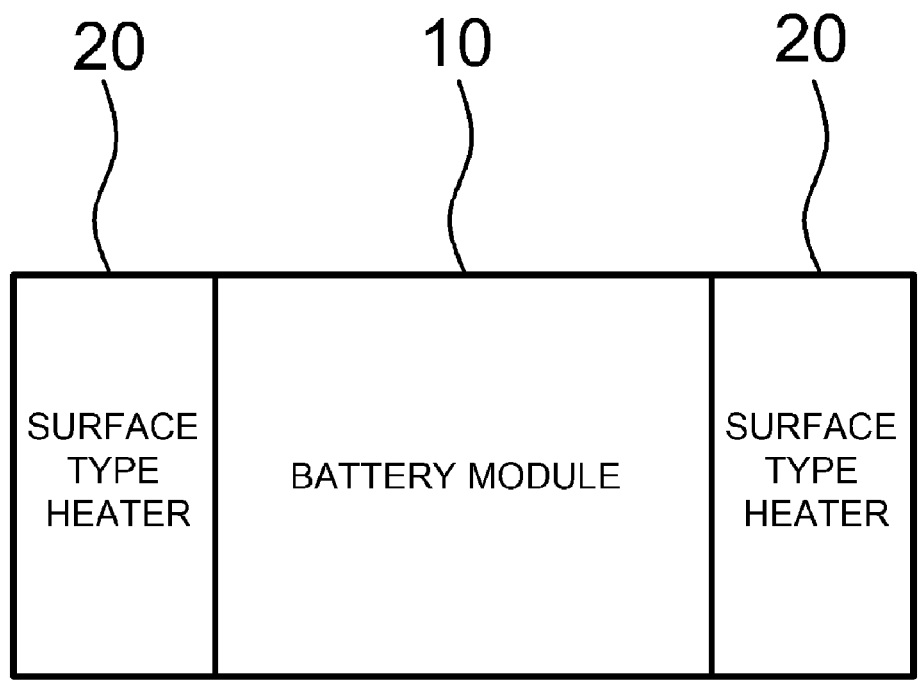
FIG. 1 is an exemplary diagram schematically illustrating a heater mounted within a battery module in a battery temperature raising system according to an exemplary embodiment of the present invention.

FIG. 1 is an exemplary diagram schematically illustrating a heater mounted within a battery module in a battery temperature raising system according to an exemplary embodiment of the present invention. As illustrated in FIG. 1, as the heater in the battery temperature raising system according to the exemplary embodiment of the present invention, a surface type heater 20, which is simpler and safer than a thermal management system using a PTC heater and a circulating fluid and is smaller in size and lighter in weight than a blanket type heater, may be used. According to the exemplary embodiment of the present invention, a method of using the surface type heater, that is, a heat conduction temperature rising method of increasing a battery temperature using a heating operation of the surface type heater 20 by attaching the surface type battery 20, which may be operated by power from the battery, to a battery module 10 may be adopted.

Figure 2:
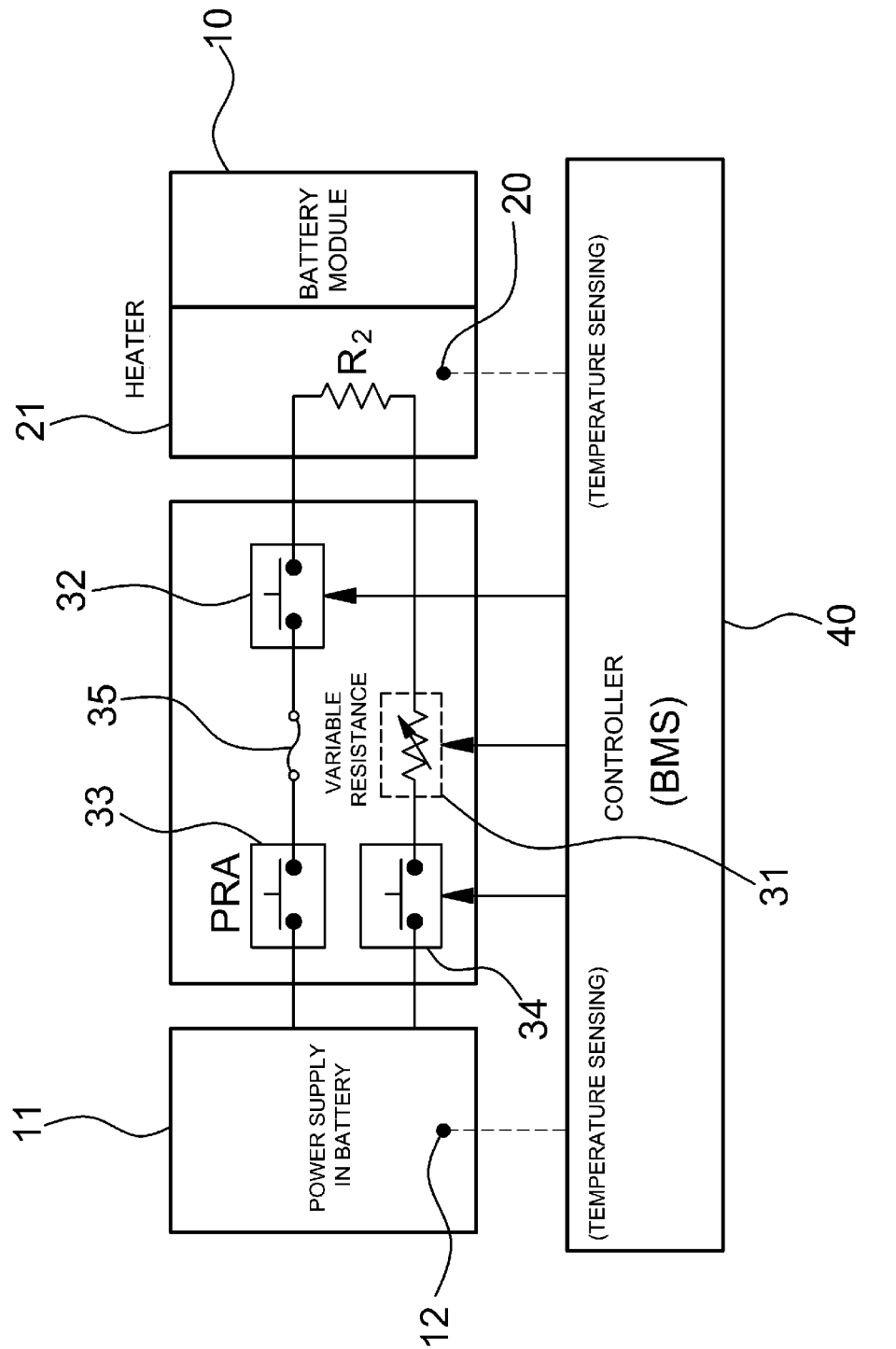
FIG. 2 is an exemplary diagram schematically illustrating a configuration of the battery temperature raising system according to the exemplary embodiment of the present invention.

FIG. 2 is an exemplary diagram schematically illustrating a configuration of the battery temperature raising system according to the exemplary embodiment of the present invention. As illustrated in FIG. 2, the battery temperature raising system may include: a power supply 11 configured to operate the heater; the heater 20 attached to the battery module 10 and configured to increase the battery temperature by the heating operation; a variable resistor 31 mounted on a circuit between the power supply 11 and the heater 20 and configured to adjust a heating value of the heater 20 based on an adjustment state of a resistance value; a heater relay 32 mounted on the circuit between the power supply 11 and the heater 20 and configured to open and close the circuit to selectively turn the heater 20 on an off; a first sensor 12 configured to sense the battery temperature; a second sensor 21 configured to sense a heater temperature; and a controller 40 configured to output a control signal to operate the heater relay 32 to selectively turn the heater 20 on and off based on temperature information sensed by the first and second sensors 12 and 21 and a control signal to adjust the resistance value of the variable resistor 31.

FIG. 2 illustrates the surface type heater 20 which may be operated by being supplied with the power from the battery, in which the surface type heater 20, which may be a heater (e.g., temperature rising heater) to increase the battery temperature, may be attached to the battery module 10 as illustrated in FIG. 1. The power supply 11 may be configured to operate the surface type heater 20 and may be a battery, and a power relay assembly (PRA) which may be switched to selectively supply power from the battery to a vehicle is installed at a direct current (DC) link end of the battery.

The power relay assembly (PRA) may be mounted to selectively open and close the power supply 11, which may be a battery, on a DC circuit that connects between the battery, which may be the power supply 11, and the heater 20, and may include a plurality of high voltage relays and fuses. In particular, the power relay assembly (PRA) may include two high voltage main relays 33 and 34 which may be a main power contact, a fuse 35, and a heater relay (e.g., temperature rising relay) 32 configured to selectively operate the heater 20. Each relay 32, 33, or 34 of the power relay assembly (PRA) may be turned on and off based on the relay control signal output by the controller 40, in which the controller 40 may be a battery management system (BMS) configured to collect battery state information.

According to the exemplary embodiment of the present invention, the controller 40 may be configured to receive a battery temperature (e.g., battery cell temperature) and heater temperature sensed by the first and second sensors 12 and 21 and may be configured to output the control signal to operate the heater relay 32 to be turned on and off based on the temperature information, in particular, the battery temperature sensed by the first and second sensors 12 and 21. In addition, the controller 40 may be configured to output the control signal to adjust the resistance value of the variable resistor 31 mounted on a circuit (e.g., power supply circuit) between the battery which may be the power supply 11 and the heater 20 which may be the temperature rising unit. In particular, the variable resistor 31 may be provided to adjust the resistance value based on the control signal of the controller 40.

According to the exemplary embodiment of the present invention, the controller 40 may be configured to output the control signal to adjust the resistance value of the variable resistor 31 based on the battery temperature and the heater temperature sensed by the first and second sensors 12 and 21. It may be appreciated from FIG. 2 that the fuse 35, the heater relay 32, the heater, and the variable resistor 31 may be connected in series.

Table 1 shows the heating state of the heater 20 based on the resistance value of the variable resistor 31, in which when the resistance value of the variable resistor decreases, the heating value of the heater which increases the battery temperature may increase, and when the resistance value of the variable resistor is increased, the heating value of the heater which increases the battery temperature may decrease.

TABLE 1

| Resistance value of variable resistor | Heating value of heater ($Q = I2R$) |
|---|---|
| Decrease | Increase |
| Increase | Decrease |

Figure 3:
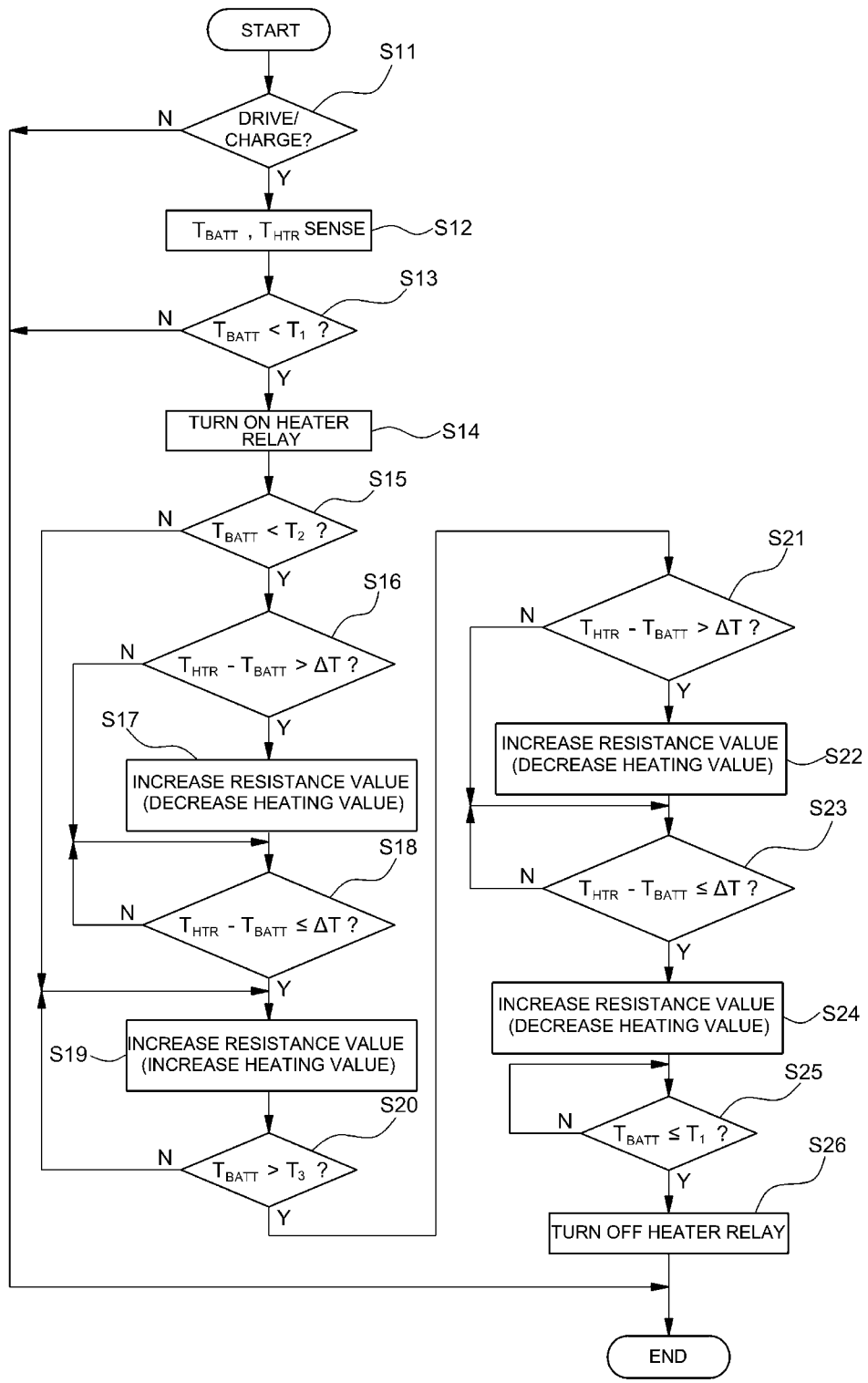
FIG. 3 is an exemplary flow chart illustrating a control method of the battery temperature raising system according to the exemplary embodiment of the present invention.
Figure 4:
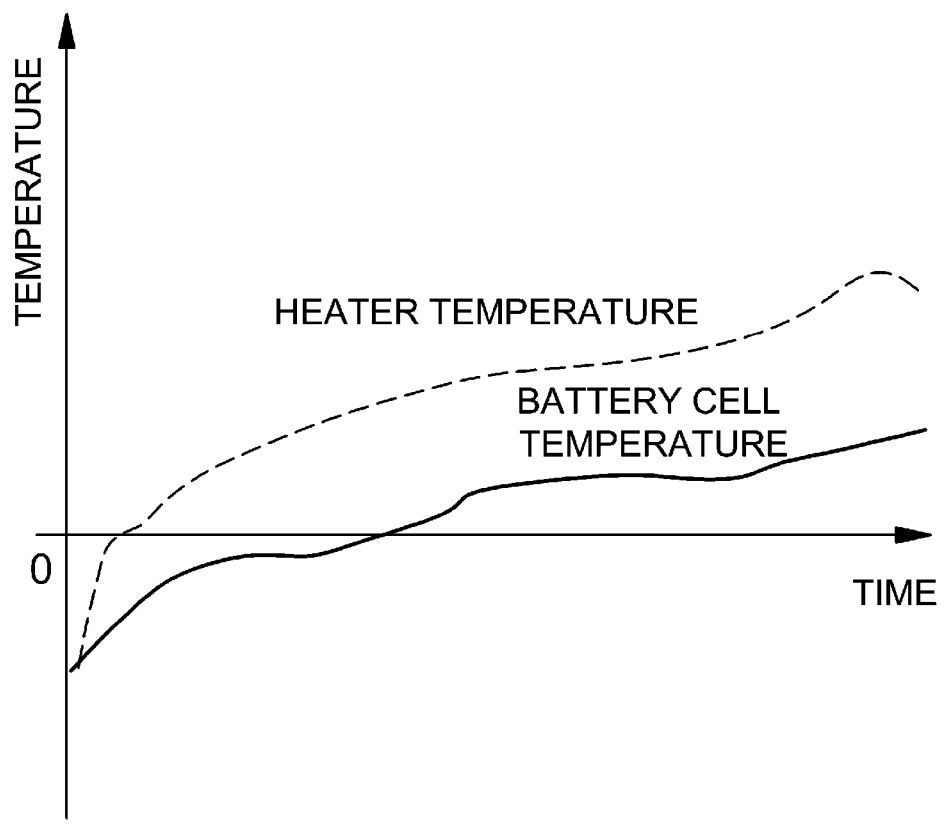
FIG. 4 is an exemplary diagram illustrating a heater temperature and a battery temperature (e.g., battery cell temperature) during a control process of the battery temperature raising system according to the exemplary embodiment of the present invention.

Hereinafter, the control process of the temperature raising system according to the exemplary embodiment of the present invention will be described in detail with reference to the accompanying drawings. FIG. 3 is an exemplary flow chart illustrating a control method of the battery temperature raising system according to the exemplary embodiment of the present invention and FIG. 4 is an exemplary diagram illustrating a heater temperature and a battery temperature (e.g., battery cell temperature) during a control process of the battery temperature raising system according to the exemplary embodiment of the present invention.

The battery temperature may be increased to charge the battery more smoothly while securing an output required when driving a vehicle. There is a need to increase the battery temperature when the battery is used to drive and charge the vehicle, and the like and the controller may be configured to perform the battery temperature rising process while adjusting the resistance value of the variable resistor based on the battery temperature and the heater temperature.

First, a battery temperature TBATT and a heater temperature THTR may be sensed by the first and second sensors when a main relay is turned on while driving the vehicle or charging the battery and the controller may be configured to receive the sensing values of the first and second sensors (S11 and S12). The controller may be configured to compare the battery temperature TBATT with a predetermined first reference temperature T1 (S13), and when the battery temperature TBATT is less than the first reference temperature T1 (that is, TBATT<T1), the controller may be configured to determine that a battery temperature rise is required and turn on the heater relay (S14). Additionally, the controller may be configured to compare the battery temperature TBATT with a predetermined second reference temperature T2 (herein T2<T1) when the heater relay is turned on (S15), and when the battery temperature TBATT is in a cryogenic state less than the second reference temperature T2 (that is, TBATT<T2), the controller may be configured to compare a deviation between the heater temperature THTR and the battery temperature TBATT with a predetermined proper temperature deviation ΔT (S16).

Herein, when the deviation (THTR−TBATT) between the temperatures is greater than the proper temperature deviation ΔT (that is, the case of THTR−TBATT>ΔT), the controller may be configured to increase the resistance value of the variable resistor as much as a set value and decrease the heating value of the heater (S17). When the battery temperature TBATT rises and thus the deviation THTR−TBATT between the heater temperature THTR and the battery temperature TBATT is equal to or less than the proper temperature deviation ΔT (that is, when THTR−TBATT=ΔT), the controller may be configured to decrease the resistance value of the variable resistor as much as the set value and thus increase the heating value of the heater again (S18 and S19). The controller may be configured to compare the battery temperature TBATT with a predetermined third reference temperature T3 (herein T1>T3>T2) (S120), and when the battery temperature TBATT is greater than the third reference temperature T3 (that is, TBATT>T3), the controller may be configured to compare the deviation THTR−TBATT between the heater temperature THTR and the battery temperature TBATT with the proper temperature deviation ΔT again (S21).

Moreover, when the deviation (THTR−TBATT) between the temperatures is greater than the proper temperature deviation ΔT (that is, the case of THTR−TBATT>ΔT), the controller may be configured to increase the resistance value of the variable resistor as much as a set value and thus decrease the heating value of the heater (S22). When the deviation THTR−TBATT between the heater temperature THTR and the battery temperature TBATT is less than the proper temperature deviation ΔT (that is, THTR−TBATT=ΔT), the controller may be configured to increase the resistance value of the variable resistor by the amount of the set value and thus additionally decrease the heating value of the heater (S23 and S24). Therefore, when the battery temperature TBATT is greater than the third reference temperature T3 in step S20, the processes (S21 to S24) of additionally adjusting the resistance value of the variable resistor and the heating value of the heater step-by-step based on the deviation THTR−TBATT between the heater temperature THTR and the battery temperature TBATT may be performed.

Furthermore, the controller may be configured to compare the battery temperature TBATT with the first reference temperature T1 (S25), and determine that no more battery temperature rising is required when the battery temperature TBATT is equal to or greater than the first reference temperature T1 (that is, when TBATT=T1), to turn off the heater relay and terminate the battery temperature rising (S26). When the battery temperature TBATT is equal to or greater than the second reference temperature T2 in step S15 (that is, when TBATT=T2), the process may proceed to step S20 and the controller may be configured to compare the battery temperature TBATT with the third reference temperature T3, and when the deviation THTR−TBATT between the heater temperature THTR and the battery temperature TBATT is equal to or less than the proper temperature deviation ΔT (that is, when THTR−TBATT=ΔT) in step S21, the controller may be configured to increase the resistance value of the variable resistor only one step in step S24 (decrease in the heating value of the heater).

In the control process of the exemplary embodiment as described above, the heating value of the heater may be adjusted by properly changing the resistance value of the variable resistor based on the deviation between the heater temperature and the battery temperature during the battery temperature rising process. When the battery temperature is in a cryogenic state less than the second reference temperature, the resistance value of the variable resistor may be decreased under the condition that the deviation between the heater temperature and the battery temperature is maintained within the proper temperature deviation to rapidly increase the battery temperature and to thus increase the heating value of the heater.

Moreover, the battery temperature rises in the heater relay turn on and the heater turn on state when the battery temperature is the substantially low temperature state (e.g., a predetermined low temperature state) the temperature of which may be slightly greater than that in the cryogenic state. When the battery temperature is equal to or greater than the second reference temperature but equal to or less than the third reference temperature, and then when the battery temperature rises to the third reference temperature or greater, the deviation between the heater temperature and the battery temperature may be confirmed and the resistance value of the variable resistor may be properly increased to decrease the heating value of the heater. In other words, when the battery temperature rises to a predetermined temperature, the output value of the battery may be increased to cause the battery temperature to rise due to the heating of the battery. In particular, the heating value of the heater may be reduced by adjusting the variable value of the variable resistor to decrease the energy required to increase the battery temperature.

When the desired output is produced from the battery and the temperature rising is not required, that is, the battery temperature is equal to or greater than the first reference temperature, the heater relay and the heater may be turned off and thus the battery temperature rising may terminate.

When the temperature deviation between the heater and the battery deviates from a predetermined value, the resistance value of the variable resistor may be increased and thus the heating value of the heater may be reduced (S17 and S22) to prevent the thermal deformation of the heater and the reduction in the battery lifespan due to the substantial temperature difference between the heater and the battery may be prevented. The heating value of the heater may be decreased by increasing the resistance value of the variable resistor before the battery temperature rising process ends, thereby securing the safety of the battery even when the battery is continuously heated accidentally due to the failure of the system, and the like.

Although the exemplary embodiments of the present invention are described above in detail, the protection scope of the present invention is not limited thereto, and various changes and improved forms by those skilled in the art using basic concepts of the present invention defined in the following claims belong to the protection scope of the present invention.

What is claimed is:

1. A battery temperature raising system, comprising:
   a power supply configured to operate a heater,
   a heater disposed on a battery module and configured to increase a battery temperature by a heating operation;
   a variable resistor disposed on a circuit between the heater and the power supply and configured to adjust a heating value of the heater based on an adjusted resistance value of the variable resistor, by an operator;
   a heat relay mounted on the circuit between the heater and the power supply and configured to open and close the circuit to selectively turn the heater on and off;
   a first sensor configured to sense the battery temperature;
   a second sensor configured to sense a heater temperature; and
   a controller configured to output a control signal to adjust the resistance value of the variable resistor based on deviation between the battery temperature and the heater temperature,
   wherein the controller is set to decrease the resistance value of the variable resistor, in response to determining that deviation between the heater temperature and the battery temperature is equal to or less than a predetermined temperature deviation by comparing the deviation between the heater temperature and the battery temperature with the predetermined temperature deviation during the resistance value adjusting process.

2. The battery temperature raising system of claim 1, wherein the controller is configured to:
   turn on the heater relay when the battery temperature is less than a predetermined first reference temperature T1 and decrease the resistance value of the variable resistor when the battery temperature is in a cryogenic temperature state less than a second reference temperature T2 (T2<T1) to perform a resistance value adjusting process to increase a heat value of the heater.

3. The battery temperature raising system of claim 1, wherein the controller is set to decrease the heating value of the heater by increasing the resistance value of the variable resistor when the deviation between the heater temperature and the battery temperature is greater than the predetermined temperature deviation during the resistance value adjusting process.

4. The battery temperature raising system of claim 2, wherein the controller is configured to: increase the resistance value of the variable resistor to perform an additional resistance value adjusting process of decreasing the heating value of the heater, in response to determining that the battery temperature rises to a temperature greater than a third reference temperature by comparing the battery temperature with the predetermined third reference temperature T3 (T1>T3>T2) after the resistance value adjusting process.

5. The battery temperature raising system of claim 4, wherein the controller is set to increase the resistance value of the variable resistor in response to determining that the deviation between the heater temperature and the battery temperature is equal to or less than the predetermined temperature deviation by comparing the deviation between the heater temperature and the battery temperature with the predetermined temperature deviation during the additional resistance value adjusting process.

6. The battery temperature raising system of claim 5, wherein when the deviation between the heater temperature and the battery temperature is greater than the predetermined temperature deviation during the additional resistance value adjusting process, the controller is configured to increase the resistance value of the variable resistor to decrease the heating value of the heater and when the deviation between the heater temperature and the battery temperature is less than the predetermined temperature deviation, the controller is configured to additionally increase the resistance value of the variable resistor.

7. The battery temperature raising system of claim 1, wherein the heater is a surface type heater attached to the battery module to increase the battery temperature.

8. The battery temperature raising system of claim 1, wherein the heating value of the heater is decreased by increasing the resistance value of the variable resistor before the battery temperature rising process ends, to secure the safety of the battery even when the battery is continuously heated accidentally due to the failure of the system.

* * * * *